No. 784,814. PATENTED MAR. 14, 1905.
C. P. STEINMETZ.
RAILWAY MOTOR CONTROL.
APPLICATION FILED AUG. 20, 1904.

2 SHEETS—SHEET 1.

Witnesses
J. Ellis Glen.
Helen Orford.

Inventor:
Charles P. Steinmetz.
By Albert G. Davis
Atty.

No. 784,814.                                        PATENTED MAR. 14, 1905.
C. P. STEINMETZ.
RAILWAY MOTOR CONTROL.
APPLICATION FILED AUG. 20, 1904.

2 SHEETS—SHEET 2.

Witnesses
J. Ellis Glen.
Helen Orford

Inventor:
Charles P. Steinmetz.
By Albert G. Davis
Atty.

No. 784,814. Patented March 14, 1905.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

RAILWAY-MOTOR CONTROL.

SPECIFICATION forming part of Letters Patent No. 784,814, dated March 14, 1905.

Application filed August 20, 1904. Serial No. 221,480.

*To all whom it may concern:*

Be it known that I, CHARLES P. STEINMETZ, a citizen of the United States, residing at Schenectady, in the county of Schenectady and State of New York, have invented certain new and useful Improvements in Railway-Motor Control, of which the following is a specification.

My invention relates to the control of electric motors, and is particularly applicable to the control of railway-vehicles propelled by electric motors, though it is not limited to this specific application.

The object of my invention is to provide a novel and efficient control system by means of which electric motors may be operated on either alternating or direct current. Although direct current has been used almost exclusively in the past for electric railways, in the last few years alternating current has been adopted for a number of railway-lines. On account of its ease of transmission alternating current is particularly adapted for long-distance interurban lines. For lines within the limits of a city, however, alternating current at a high potential is not suitable, and consequently it has been proposed to supply electric roads from two sources, one furnishing alternating current for use outside of cities and the other furnishing direct current for use within the city limits. When such a system is adopted, it becomes important that a car should be able to operate on either system.

My invention consists in providing a novel control system applicable to certain types of motors and enabling them to be operated efficiently on either direct or alternating current.

My invention will best be understood by reference to the accompanying drawings, in which—

Figure 1:
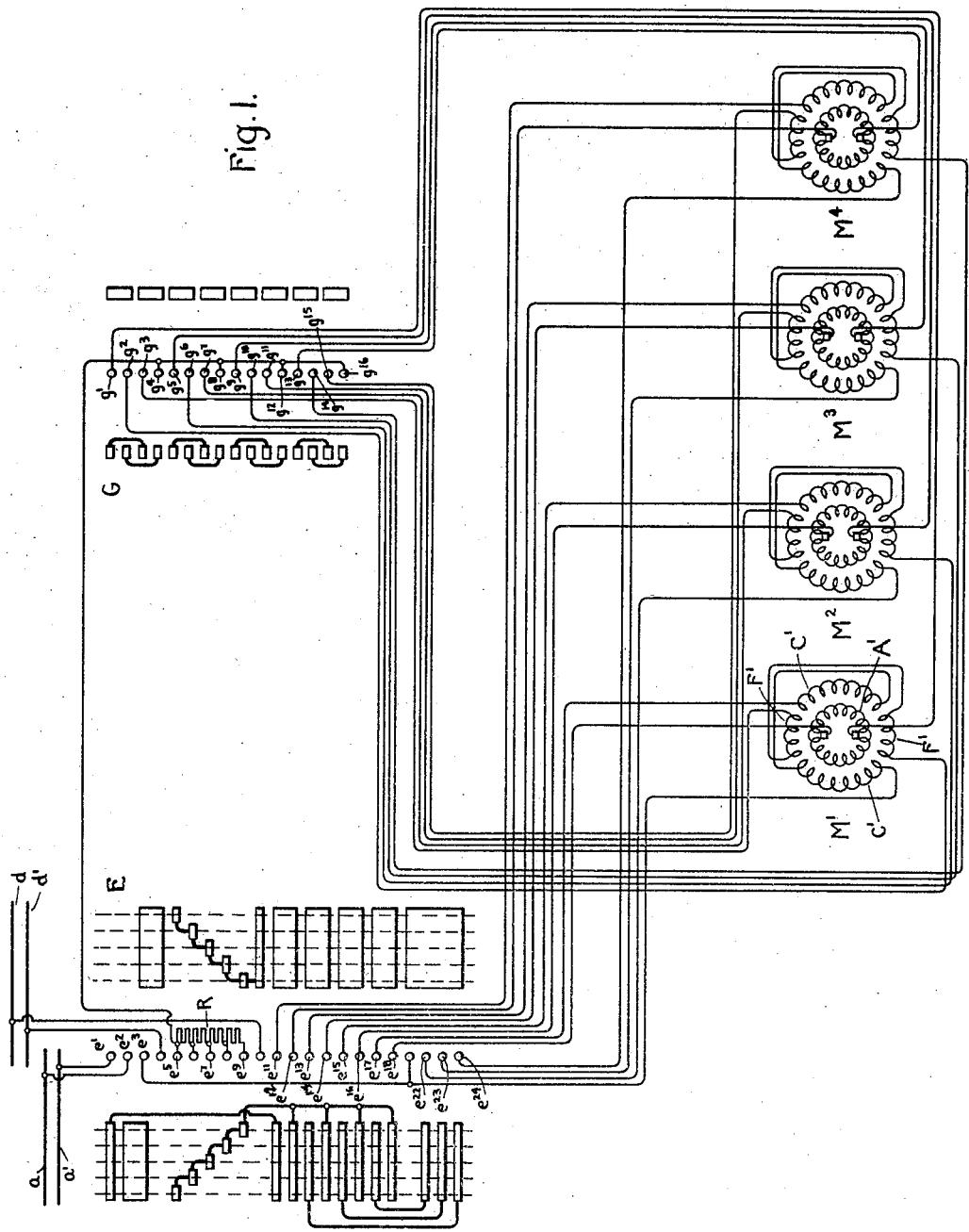
Figure 2:
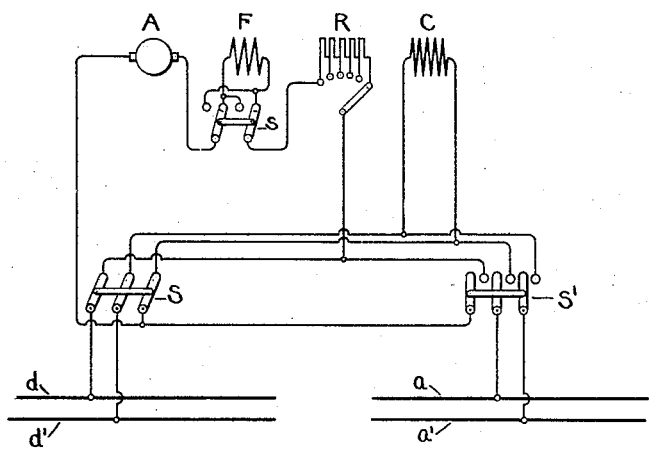
Figure 3:
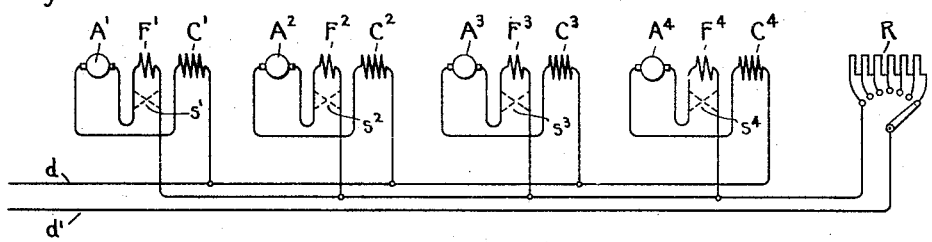
Figure 4:
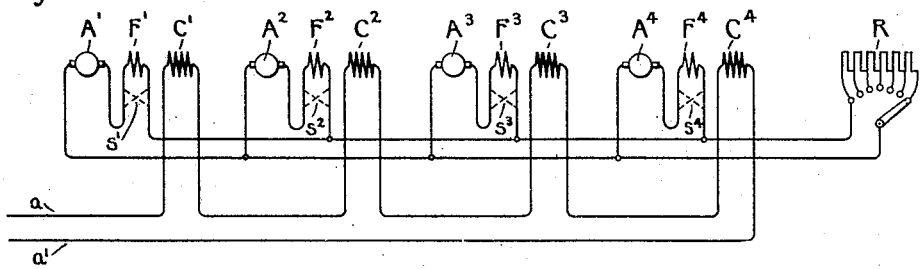

Figure 1 shows diagrammatically a control system arranged in accordance with my invention. Fig. 2 shows a diagram of connections for the control of a single motor in accordance with my invention, and Figs. 3 and 4 show the connections for four motors produced by the control system of Fig. 1.

The type of motor to which my invention relates is shown diagrammatically in Fig. 1 and is what is known as a "compensated" series motor. Four of these motors are shown in the figure indicated by M', M², M³, and M⁴. The motor M' is provided with three sets of windings, the armature-winding indicated by A', a winding which I shall call the "field" indicated by F' F', and a winding which I shall call the "compensating" winding indicated by C' C'. If all these windings are connected in series, it will be seen that the current in the field-windings F' F' produces a magnetization at right angles to that produced by the armature-winding A', and consequently produces a torque therewith. The windings C' C', on the other hand, produce a magnetization parallel to that produced by the armature-winding A', and consequently can exert no torque therewith; but if this winding is so connected that the current in each conductor is in the opposite direction to that in the adjacent conductor of the armature-winding A' the windings C' C' will act to neutralize the armature reaction and for this reason are termed "compensating" windings. The neutralization of the armature reaction enables the motor to operate on direct current sparklessly with a weaker field than would be otherwise possible. This ability to operate on a weak field is of importance when the motor is operated on alternating current, since the number of field turns, and consequently the self-induction of the field, may be reduced and the power factor correspondingly increased. Furthermore, when the motor is operated on alternating current the compensating windings C' C', if connected in series with the armature, serve effectively to neutralize its self-induction. The motor may consequently be operated on either direct or alternating current, with the three windings connected in series. This necessitates, however, that the direct and alternating voltages from which the motor is supplied should bear a certain ratio to each other, for there are definite maximum voltages for both direct and alternating current above which sparkless operation is difficult to secure, since the voltage impressed upon the commutator cannot be indefinitely increased. If, however, the compensating windings C' C' alone are connected to the source of alternating current, while the armature-winding A and the field-windings F' F' are connected in series in a short circuit, the windings C' C' will act as the primary of a transformer to induce an electromotive force in the winding A', and the ratio of the electromotive force impressed upon the compensating winding and induced in the armature-winding may be made anything desired by properly proportioning the relative number of turns of the two windings. Consequently greater flexibility is obtained and higher alternating voltage may be used, while the current in the windings C' C' and in the winding A' serve mutually each to neutralize the self-induction of the other in the same manner as with the series connection.

My invention consists in the combination with one or more motors of the type illustrated and described of two sources of direct and alternating current, respectively, and means for connecting all three windings of the motor or motors in series to the source of direct current or for connecting the compensating winding to the source of alternating current and short-circuiting the other two windings in series with each other.

My invention further consists in the combination, with the above, of a variable resistance connected in the armature-circuit, by means of which the speed of the motor or motors may be varied.

Now referring to Fig. 2, the circuit connections for a single motor will be readily understood. The lines $d$ $d'$ represent a source of direct current, and $a$ $a'$ represent a source of alternating current. A represents the armature, F the field, and C the compensating winding, of a motor of the type described. R represents a variable resistance, and S and S' represent switches, adapted, respectively, to connect the motor to the direct-current source or to the alternating-current source. $s$ represents a reversing-switch, by means of which the connections of winding F, and consequently the motor torque, may be reversed. With the switch S closed, as shown, and the switch S' open, the following circuit may be traced: from line-wire $d$ through switch S, resistance R, reversing-switch $s$, field-winding F, armature A, switch S, compensating winding C, switch S, line-wire $d'$. The three windings are consequently connected in series and the motor operates as a direct-current compensated series motor. With switch S open and switch S' closed the following circuit may be traced: from line-wire $a$, through switch S', compensating winding C, switch S', line-wire $a'$. Compensating winding C is consequently connected directly across the source of alternating-current voltage. A second local circuit is closed as follows: from the right-hand brush of armature A, through reversing-switch $s$, field F, resistance R, switch S', to the left-hand brush of armature A. The armature, field-winding, and resistance are consequently connected in closed circuit.

It will be seen that with the motor connected either for direct or alternating current the direction of rotation may be reversed by shifting the switch $s$, since the direction of torque is reversed thereby. Furthermore, the amount of current-flow and the motor speed and torque may be regulated by varying the variable resistance R.

Evidently a plurality of motors may be controlled by a single resistance. Such an arrangement is shown in Fig. 3, in which four motors are shown connected for operation to a direct-current source, all switches being omitted. It will be seen that all four motors are connected in parallel between the line-wire $d$ and the left-hand terminal of resistance R, the three windings of each motor being connected in series. By varying the resistance R the speed and torque of the four motors may be simultaneously controlled.

Fig. 4 similarly shows the connections of the same four motors for operation on alternating current. The four compensating windings $C'$ to $C^4$ are connected in series to the line-wires $a$ $a'$. The field and armature of each motor are connected in series, and the four armature-circuits are short-circuited in parallel through the resistance R. Thus with this connection as with the other the speed and torque of the motors may be controlled by the one variable resistance. Reversing-switches for the field-windings are indicated by the dotted lines $s'$ to $s^4$ in both figures. By connecting the compensating windings in series the line-voltage is divided among the motors.

With the above explanation the arrangement of Fig. 1 will be clear. E represents the controlling-switch, by means of which the four motors M' to M$^4$ are connected for operation on direct or alternating current and by means of which the variable amounts of the resistance R are included in the motor-circuit, so as to control the speed and torque of the motors. Evidently the two functions of connecting the motors for alternating or direct current and of varying the amount of resistance in the motor-circuits may be separated and performed by different switches, as in the arrangement of Fig. 2. G represents the reversing-switch for varying the relative connections of the several field-windings F' to F$^4$, so as to vary the direction of rotation of the motors.

If the controlling-switch E is moved to bring the left-hand set of movable contacts in engagement with the stationary contact-fingers, and if the reversing-switch G is closed in either direction—as, for instance by bringing the left-hand movable contacts in engagement with the stationary contact-fingers—the following circuits will be completed: One circuit may be traced from line-wire $a$, contact $e^2$, contact $e^3$, compensating winding $C'$ $C'$, contact $e^{17}$, contact $e^{22}$, compensating winding $C^2$ $C^2$, contact $e^{15}$, contact $e^{23}$, compensating winding $C^3$ $C^3$, contact $e^{13}$, contact $e^{24}$, compensating winding $C^4$ $C^4$, contact $e^{11}$, contact $e'$, line-wire $d'$. The four compensating windings are consequently connected in series to the line, as shown in Fig. 4. The upper commutator-brushes which form one terminal of the armature-windings and which are connected to contacts $e^{12}$ $e^{14}$ $e^{16}$ $e^{18}$ are all connected through contact $e^9$ to one terminal of resistance R, the other terminal of which is connected, through the reversing-switch, to one terminal of the field-windings $F'$ to $F^4$, the other terminals of which are connected to the lower armature-brushes through the reversing-switch. The connection of the armatures and fields is consequently that shown in Fig. 4, and as controlling-switch E is moved through its several positions and the amount of resistance R included in this short circuit is varied the speed and torque of the motors may be controlled as desired. On the other hand, if the right-hand set of movable contacts are moved into engagement with the contact-fingers the following circuits are established: from line-wire $d$ through contact-fingers $e^{10}$ and $e^9$ to one terminal of resistance R, the other terminal of which is connected, through the reversing-switch G, to one terminal of all the field-windings, as has been heretofore traced. The other terminals of the field-windings are connected to the lower commutator-brushes of their several armatures through the reversing-switch G, while the upper commutator-brushes of the motors are each connected to one terminal of the compensating windings through switch E. The other terminals of the compensating windings are all connected, through contact-fingers $e^{21}$ to $e^{24}$, with the contact $e^3$ and thence through contact $e^4$ to line-wire $d'$. Thus the four motors are connected in the same manner as is shown in Fig. 3.

Although for the sake of simplicity I have indicated the type of motor to which my invention applies by a bipolar Gramme-ring winding, it will be understood that my invention is applicable to a compensated series motor with any well-known form of winding and with any number of poles, and by the term "compensated motor," as used in this specification and in the appended claims, I mean a motor of the commutator type, having two field-windings arranged, respectively, to produce magnetizations, one at an angle to and the other approximately parallel with the magnetization produced by the armature-winding.

I do not desire to limit myself to the particular arrangement and connections here shown; but I aim in the appended claims to cover all modifications which come within the scope of my invention.

What I claim as new, and desire to secure by Letters Patent of the United States, is—

1. In combination with a "compensated" motor having armature, field and compensating windings, a source of direct current, a source of alternating current, means for connecting all three windings in series to said direct-current source, and means for connecting the compensating winding to the alternating-current source and connecting the armature and field windings in series in a closed circuit.

2. In combination with a "compensated" motor having armature, field and compensating windings, a variable resistance, a source of direct current, a source of alternating current, means for connecting all three windings and said resistance in series and to said direct-current source, and means for connecting said compensating winding to said alternating-current source and for connecting said armature and field windings and said resistance in a closed circuit.

3. In combination with a "compensated" motor having armature, field and compensating windings, a source of direct current, a source of alternating current, means for connecting all three windings in series to said direct-current source, means for connecting the compensating winding to the alternating-current source and connecting the armature and field windings in series in a closed circuit, and means for reversing the relative connections of said armature and field windings.

4. In combination with a "compensated" motor having armature, field, and compensating windings, a variable resistance, a source of direct current, a source of alternating current, means for connecting all three windings and said resistance in series and to said direct-current source, means for connecting said compensating winding to said alternating-current source and for connecting said armature and field windings and said resistance in a closed circuit, means for varying the amount of said resistance in circuit, and means for reversing the relative connections of said armature and field windings.

5. In combination, a plurality of "compensated" motors each having armature, field and compensating windings, a source of direct current, a source of alternating current, means for connecting said motors in parallel to said direct-current source with all three windings of each motor in series, and means for connecting said compensating windings in series to said alternating-current source and connecting the armature and field windings of each motor in series with each other in a closed circuit.

6. In combination, a plurality of "compensated" motors each having armature, field and compensating windings, a variable resistance, a source of direct current, a source of alternating current, means for connecting the motors in parallel with each other and in series with said resistance to said direct-current source, all three windings of each motor being connected in series, and means for connecting said compensating windings to said alternating-current source and connecting the armature and field windings of each motor in series and connecting them in a closed circuit in parallel with the other motors and in series with said resistance.

7. In combination, a plurality of "compensated" motors each having armature, field and compensating windings, a variable resistance, a source of direct current, a source of alternating current, means for connecting the motors in parallel with each other and in series with said resistance to said direct-current source, all three windings of each motor being connected in series, and means for connecting said compensating windings in series to said alternating-current source and connecting the armature and field windings of each motor in series and connecting them in a closed circuit in parallel with the other motors and in series with said resistance.

In witness whereof I have hereunto set my hand this 19th day of August, 1904.

CHARLES P. STEINMETZ.

Witnesses:
BENJAMIN B. HULL,
HELEN ORFORD.